United States Patent
Lin et al.

(10) Patent No.: US 7,322,835 B2
(45) Date of Patent: Jan. 29, 2008

(54) BATTERY LATCH MECHANISM

(75) Inventors: Ke-Cheng Lin, Guangdong (CN); Wen-Kang Lo, Guangdong (CN); Chien-Li Tsai, Guangdong (CN)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 70 days.

(21) Appl. No.: 11/308,473

(22) Filed: Mar. 29, 2006

(65) Prior Publication Data

US 2007/0072485 A1    Mar. 29, 2007

(30) Foreign Application Priority Data

Sep. 23, 2005   (CN)   ................ 2005 2 0064984 U

(51) Int. Cl.
*H01M 2/10* (2006.01)
(52) U.S. Cl. .................. 439/96; 439/98; 439/100; 439/123
(58) Field of Classification Search .......... 439/96–100, 439/123
See application file for complete search history.

(56) References Cited

U.S. PATENT DOCUMENTS

| 4,943,498 A | | 7/1990 | Cooper et al. ............... 429/97 |
| 5,208,116 A | * | 5/1993 | Joh ............................. 429/96 |
| 5,225,293 A | | 7/1993 | Mitchell et al. ............. 429/97 |
| 5,716,730 A | * | 2/1998 | Deguchi ...................... 429/97 |
| 2007/0026297 A1 | * | 2/2007 | Qin et al. ..................... 429/97 |
| 2007/0026299 A1 | * | 2/2007 | Park et al. ................... 429/97 |
| 2007/0048599 A1 | * | 3/2007 | Choi ............................ 429/97 |

* cited by examiner

*Primary Examiner*—Gary F. Paumen
(74) *Attorney, Agent, or Firm*—Winston Hsu

(57) ABSTRACT

A latch mechanism for securing a battery module (70) includes a bracket (10), and a pair of latch members (50). The bracket includes a recess (18), a back plate (16) defining a pair of cutouts (162), and a pair of fixing frames (30) next to the cutouts. The latch members are slidably received in the fixing frames and each include a sidewall (52) defining a locking slot (522) therein. The battery module is slidably moved into the recess and includes a pair of hooks (74) separately extending through the cutouts of the bracket to engaging with the locking slots of the latch members.

13 Claims, 5 Drawing Sheets

BATTERY LATCH MECHANISM

CROSS-REFERENCES TO RELATED APPLICATION

Relevant subject matter is disclosed in the copending U.S. patent application Ser. No. 11/308,610; and the copending U.S. patent application Ser. No. 11/308,610, filed on the same date and having a same title with the present application, which are assigned to the same assignee with this patent application.

FIELD OF THE INVENTION

The present invention relates to latch mechanisms, and particularly to a latch mechanism which can easily secure a battery module in an electronic device.

DESCRIPTION OF RELATED ART

Generally, a potable electronic device, such as a notebook computer, has a battery pack as a power supply for driving source since such a computer is frequently used at a location where no commercial power supply is obtained. The battery pack is detachably contained in a battery receptacle, which is formed in the housing of the notebook computer. Referring to FIG. 5, a conventional battery receptacle 4 is defined in a housing 3. The battery pack 1 is attached/detached to/from the battery receptacle 4 and defines a notch 2 in a side thereof. The housing 3 of the computer has a lock lever 5 to locate in the notch 2 for locking the battery pack 1 to the battery receptacle 4. The lock lever 5 is attached to the housing 3 to be movable between a lock position where the lock lever 5 is engaged on the battery pack 1 and a lock releasing position where the lock lever 5 is detached from the battery pack 1. The lock lever 5 is manually operated via a handle 6. The lock lever 5 of the conventional computer has only the function of locking the battery pack 1 to the battery receptacle 4 and releasing the lock. In addition, it is troublesome to take the battery pack 1 from the housing 3 in a direction perpendicular to the housing 3.

What is desired, therefore, is a latch mechanism easily securing a battery module in an electronic device.

SUMMARY OF INVENTION

In one preferred embodiment, a latch mechanism for securing a battery module includes a bracket, and a pair of latch members. The bracket includes a recess, a back plate defining a pair of cutouts, and a pair of fixing frames next to the cutouts. The latch members are slidably received in the fixing frames and each include a sidewall defining a locking slot therein. The battery module is slidably moved into the recess and includes a pair of hooks separately extending through the cutouts of the bracket to engaging with the locking slots of the latch members.

Other advantages and novel features will become more apparent from the following detailed description of preferred embodiments when taken in conjunction with the accompanying drawings, in which:

DETAILED DESCRIPTION

Figure 1:
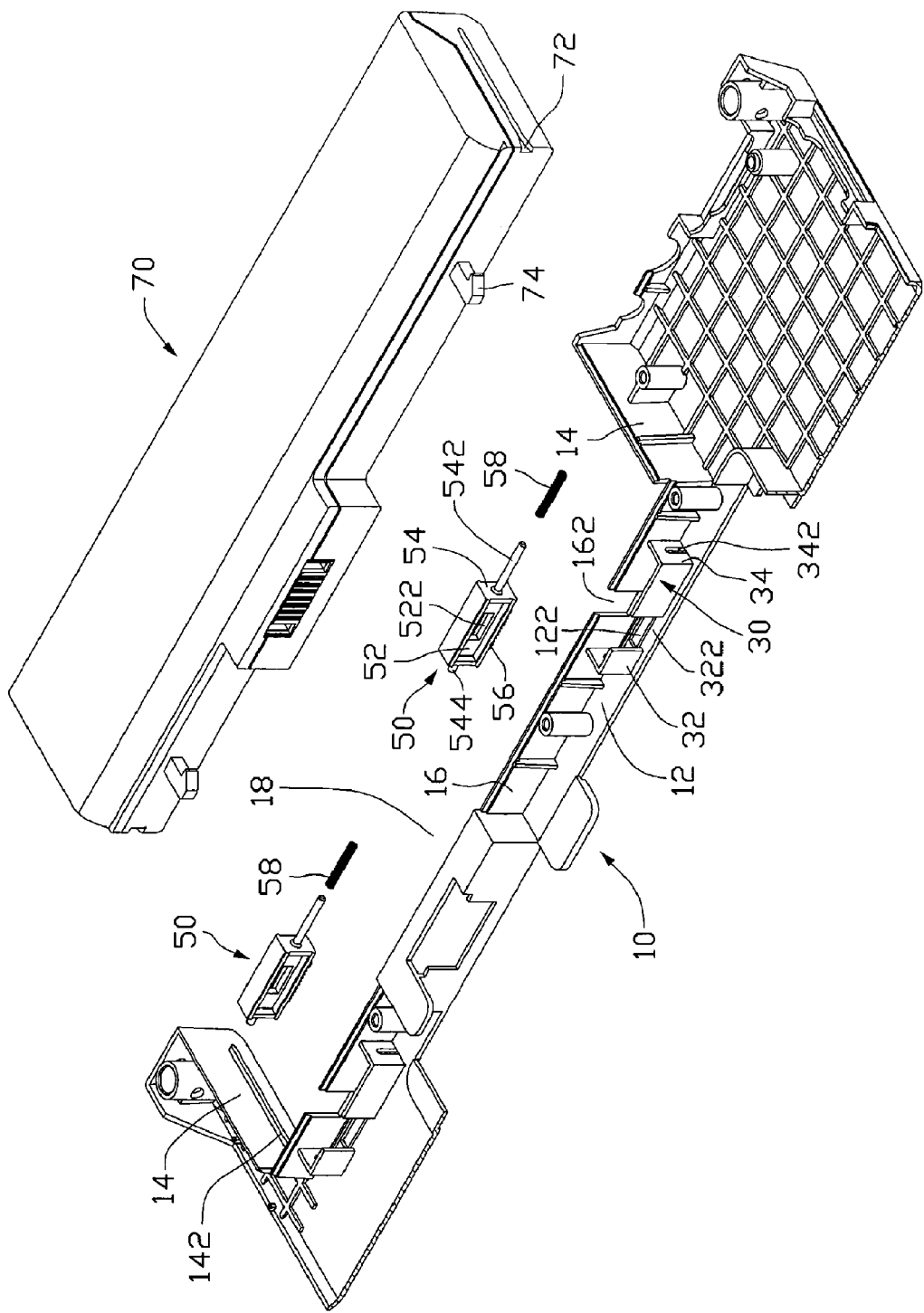
FIG. 1 is an exploded, isometric view of a latch mechanism of a battery module in accordance with a preferred embodiment of the present invention.

Referring to FIG. 1, a latch mechanism in accordance with a preferred embodiment of the present invention for securing a battery module 70 in a housing of a notebook computer. The latch mechanism includes a bracket 10, and a pair of latch members 50. Each of the latch members 50 is movably attached to the bracket 10. The bracket 10 is a part of the housing of the notebook computer.

The battery module 70 includes a pair of railways 72 defined in two sidewalls thereof, and a pair of hooks 74 extending perpendicularly from an inner wall thereof.

Figure 4:
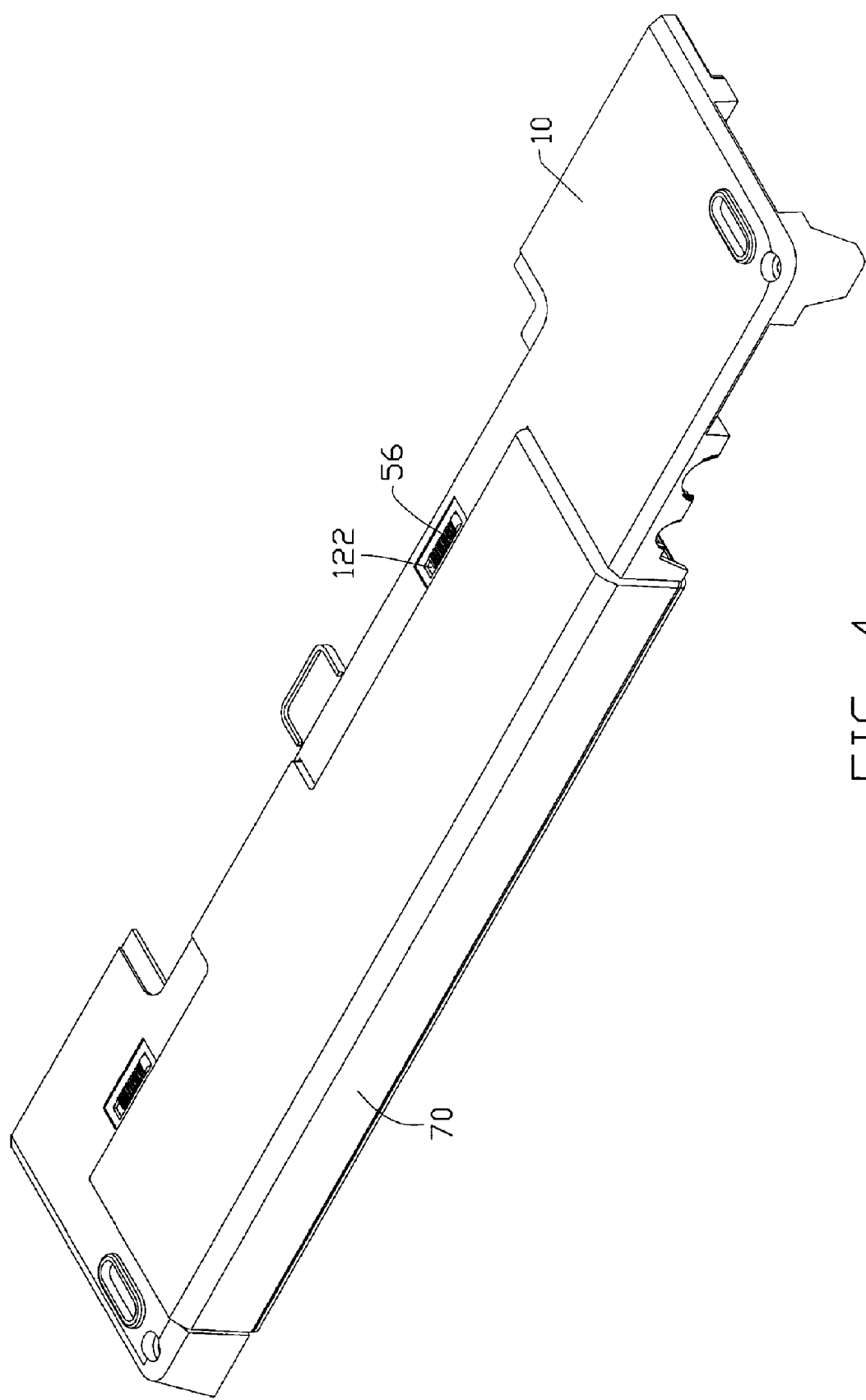
FIG. 4 is assembly view of FIG. 1, but viewed from another aspect.

Referring also to FIG. 4, the bracket 10 includes a base plate 12, a pair of side plates 14, and a back plate 16. The side plates 14 and the back plate 16 are separately perpendicular to the base plate 12 and cooperatively define a recess 18 for receiving the battery module 70 therein. A pair of sliding bars 142 extrudes from the side plates 12, corresponding to the slideways 72 of the battery module 70. A pair of cutouts 162 is defined in the back plate 16, for the hooks 74 of the battery module 70 extending therethrough. A pair of notches 122 is defined in the base plate 12, separately besides the cutouts 162.

Figure 5:
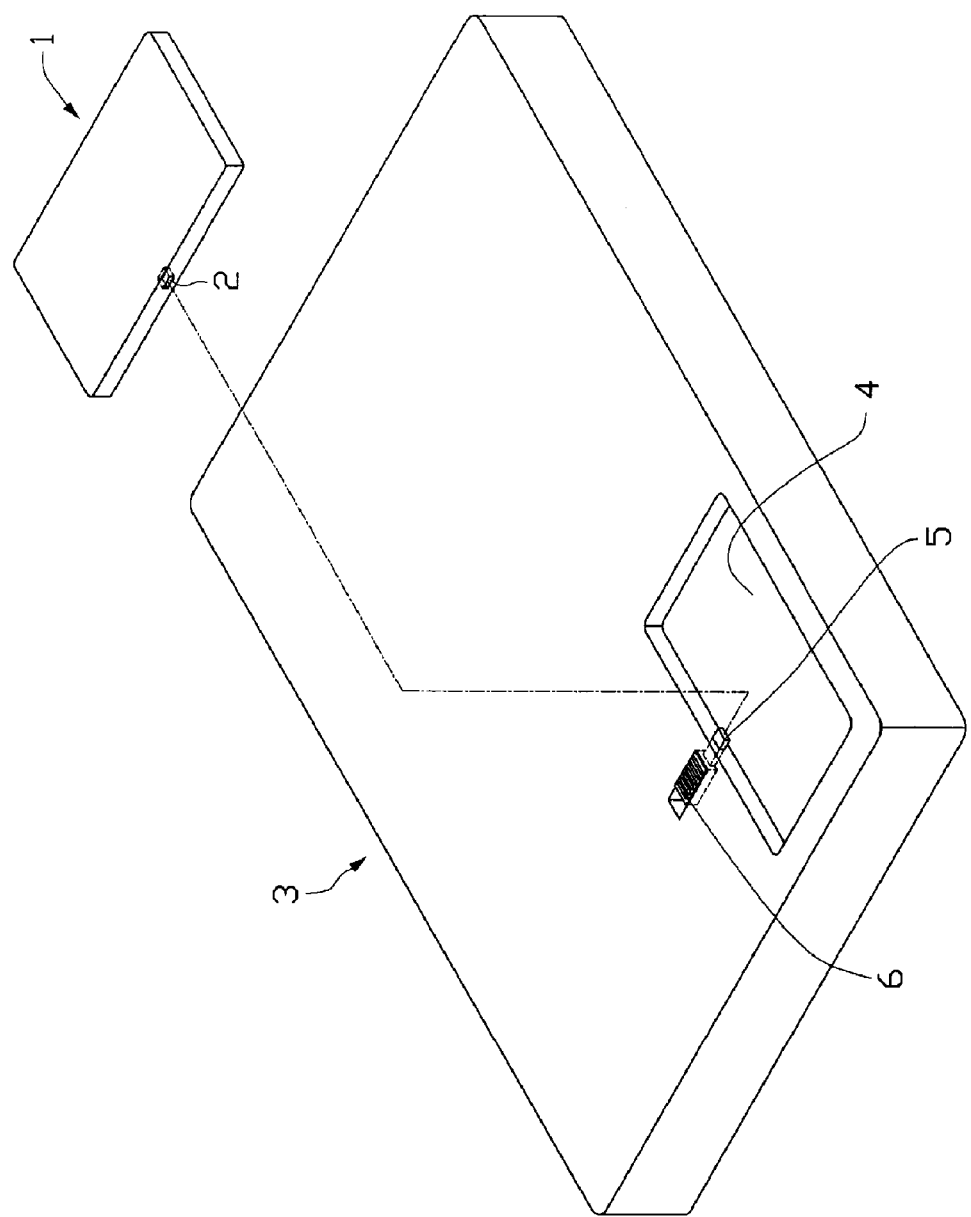
FIG. 5 is an exploded, isometric view of a conventional latch mechanism of battery module.

Referring also to FIG. 5, the back plate 16 further includes a pair of fixing frames 30 for movably receiving the latch members 50 therein. The fixing frames 30 stand perpendicularly on the base plate 12 next to the cutouts 162. Each of the notches 122 is separately encircled by the corresponding fixing frame 30.

Each of the fixing frame 30 includes a side panel 32 parallel to the back plate 16, and a pair of end panels 34 perpendicular to the side panel 32. An opening 322 is defined in each of the side panels 32, corresponding to the corresponding cutout 162 of the back plate 12. A through hole 342 is defined in each of the end panels 34.

Each of the latch members 50 includes a sidewall 52, a pair of end walls 54, and a grip portion 56 formed on a bottom wall thereof. A locking slot 522 is defined in each of the sidewalls 52. A pair of posts 542, 544 extends perpendicularly from the end walls 54, extending through the through holes 342 of the first fixing frame 30. A coil spring 58 is placed around the post 542.

Figure 2:
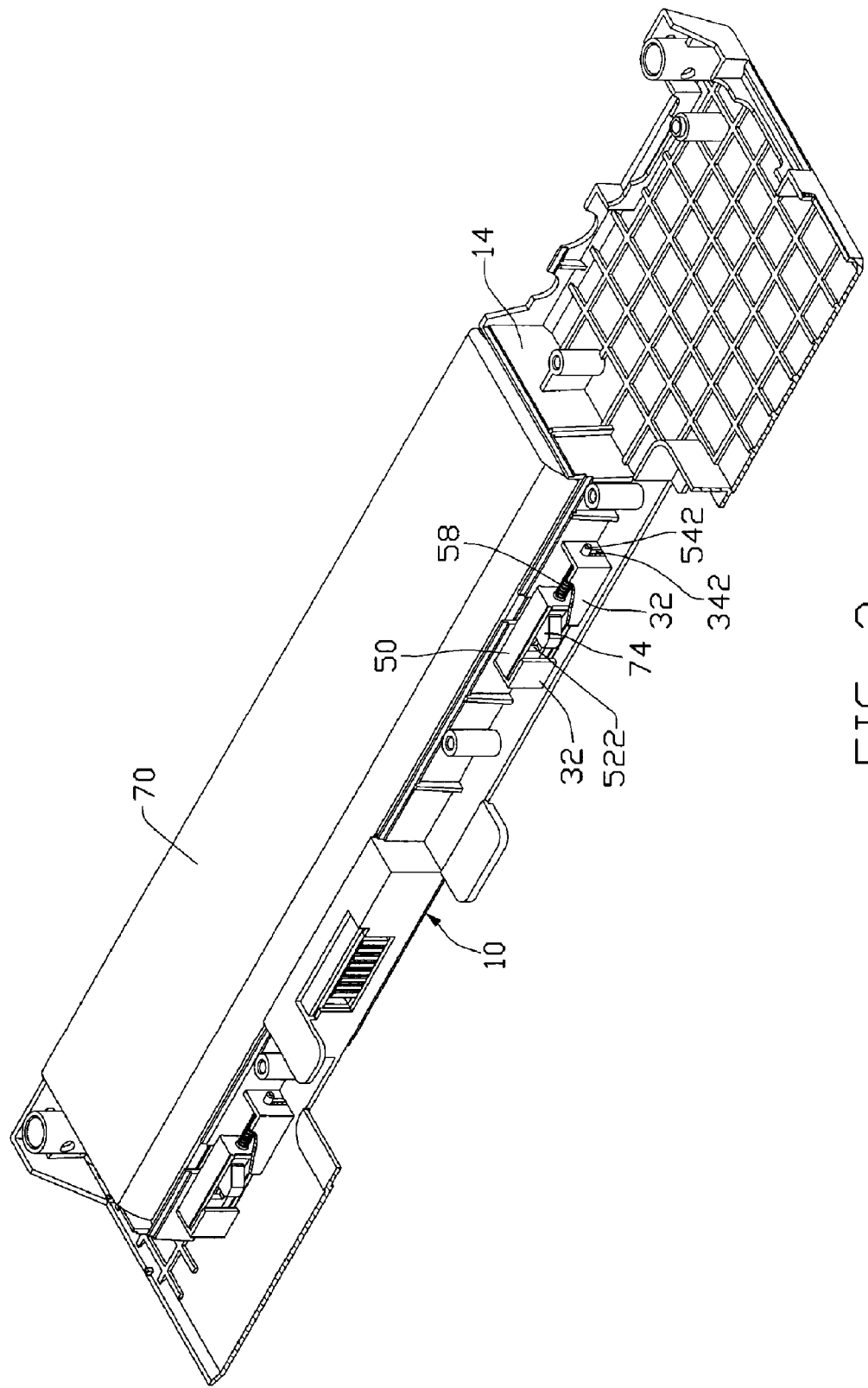
FIG. 2 and FIG. 3 are assembled views of FIG. 1, showing the latch mechanism in a locked and an unlocked states respectively.
Figure 3:
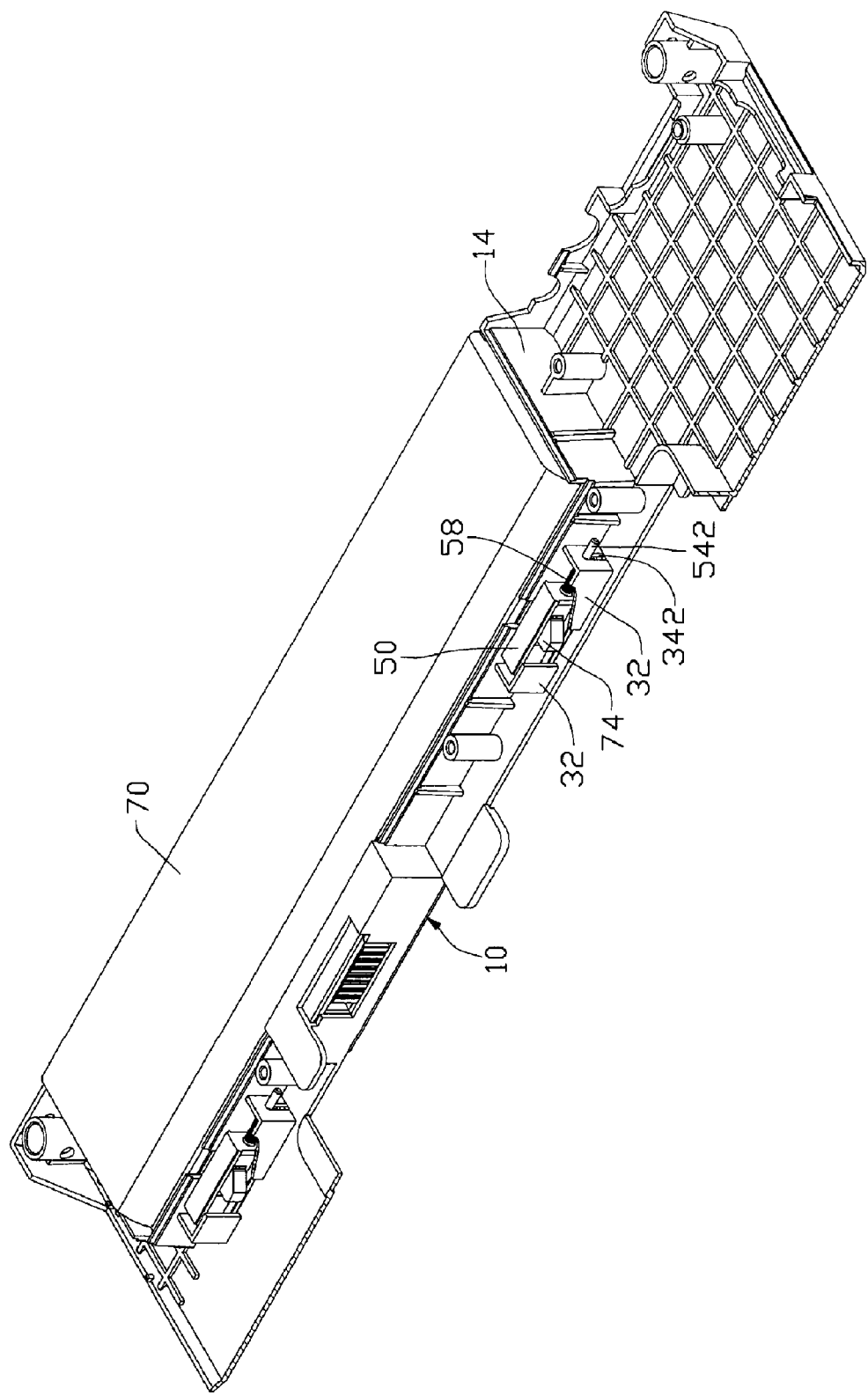

Referring also to FIGS. 2 and 3, in assembly, the latch members 50 are separately inserted into the fixing frames 30. The coil springs 58 are placed around the posts 542 of the latch members 30. Then the posts 542, 544 movably engage in the through holes 342 of the fixing frames 30. The locking slots 522 of the latch members 50 align with the cutout 162 of the back plate 16 and the opening 322 of the fixing frames 30. The grip portions 56 of the latch members 50 extend into the notches 122 of the base plate 12 of the bracket 10.

In use, the battery module 70 is moved into the recess 18 of the bracket 10, with the sliding bar 142 sliding in the railways 72. The hooks 74 of the battery module 70 engage with the latch members 50. Each hook 74 extends through the corresponding cutout 162 and engages a side of the corresponding locking slot 522 of each latch member 50 to depress the coil spring 58. The latch members 50 move accordingly so that the hooks 74 engage in the locking slots 522. Then the coil springs 58 are rebounded. The hook 74 is locked by each of the latch members 50. Thus, the battery module 70 is secured in the bracket 10.

To detach the battery module 70 from the bracket 10, the grip portions 56 of the latch members 50 are operated to move the sides of the locking slots 522 away from the hooks 74 of the battery module 70 to easily slide the battery module 70 out of the bracket 10.

It is believed that the present embodiment and its advantages will be understood from the foregoing description, and it will be apparent that various changes may be made thereto without departing from the spirit and scope of the invention or sacrificing all of its material advantages, the example hereinbefore described merely being a preferred or exemplary embodiment.

What is claimed is:

1. A latch mechanism for securing a battery module having at least one hook, the latch mechanism comprising:
   a bracket comprising a recess for slidably receiving the battery module therein, a back plate, and at least one fixing frame, the back plate defining at least one cutout for said hook extending therethrough, said fixing frame arranged corresponding to said cutout;
   at least one latch member movably received in said fixing frame, said latch member comprising a sidewall defining a locking slot therein to engage with said hook; and
   a resilient member disposed between said latch member and said fixing frame.

2. The latch mechanism as claimed in claim 1, wherein the bracket further comprises a pair of side plates, each of the side plates extrudes a sliding bar for the battery module slidably moving into the recess therealong.

3. The latch mechanism as claimed in claim 1, wherein said fixing frame comprises a side panel parallel to the back plate, and a pair of end panels perpendicular to the side panel.

4. The latch mechanism as claimed in claim 3, wherein each of the end panels defines a through hole therein, said latch member further comprises a pair of end walls perpendicular to the sidewall, a pair of posts extends from the end walls and engages in the through holes.

5. The latch mechanism as claimed in claim 4, wherein the resilient member is a coil spring placed around one of the posts.

6. The latch mechanism as claimed in claim 1, wherein the base plate defines a notch therein and encircled by said fixing frame, said latch member comprises a grip portion extending through the notch.

7. A latch mechanism assembly comprising:
   a battery module comprising a pair of hooks extending from an inner wall thereof;
   a bracket comprising a recess slidably receiving the battery module therein, and a back plate defining a pair of cutouts for the hooks extending therethrough; and
   a pair of latch members slidably attached to the bracket corresponding to the cutouts and each comprising a locking slot engaging with a hook of the battery module.

8. The latch mechanism assembly as claimed in claim 7, wherein the bracket further comprises a pair of side plates perpendicular to the back plate, the side plates and the back plate cooperatively define the recess.

9. The latch mechanism assembly as claimed in claim 8, wherein the battery module comprises a pair of slideways defined in sidewalls thereof, each of the side plates of the bracket comprises a sliding bar engaging with a corresponding slideway.

10. The latch mechanism assembly as claimed in claim 7, wherein bracket comprises a pair of fixing frames slidably receiving the latch members.

11. The latch mechanism assembly as claimed in claim 10, wherein the fixing frames each comprise a pair of end panels each defining a through hole therein, the latch members each comprise a pair of end walls each extending a post therefrom for engaging in the through hole.

12. The latch mechanism assembly as claimed in claim 11, wherein coil springs are placed around one of the posts of each of the latch members.

13. The latch mechanism assembly as claimed in claim 11, wherein each of the latch members further comprises a sidewall perpendicular to the end walls, the locking slots are defined in the sidewalls.

* * * * *